J. M. JONES.

Carriage-Spring.

No. 196. A. I. Patented Mar. 30, 1858.

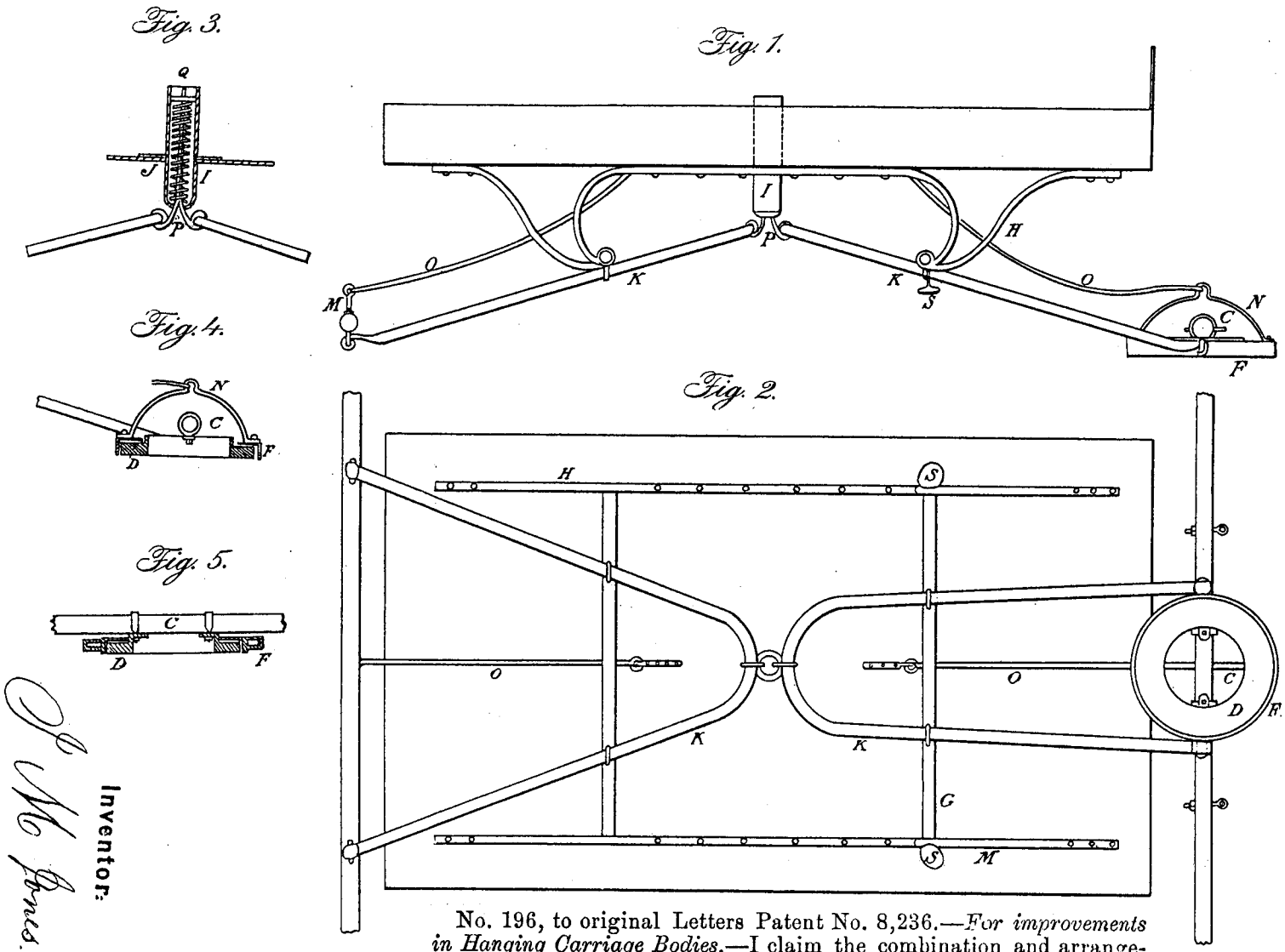

No. 196, to original Letters Patent No. 8,236.—*For improvements in Hanging Carriage Bodies.*—I claim the combination and arrangement of the disk or fifth wheel D, attached to the front axle; the embracing circularly-flanged annular disk F with its laterally projecting arms or trunnions, to which they are attached the bars or spring levers K, so as to preserve the horizontal position of the fifth wheel while allowing the necessary play of the said bars, in the manner herein described.

J. M. JONES.

Inventor:

J M Jones.

AM. PHOTO-LITHO. CO. N.Y. (OSBORNE'S PROCESS.)

DEPARTMENT OF COMMERCE
UNITED STATES PATENT AND TRADEMARK OFFICE

---

MISSING PAGE(S)

PATENT NUMBER AI 196 FOR THE ISSUE DATE 03/20/1858 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text